United States Patent
Bjørnenak (10) Patent No.: US 12,409,920 B2
(45) Date of Patent: Sep. 9, 2025

(54) TRACTION DEVICE FOR TOWING AN OBJECT ALONG A WATER SURFACE OR THROUGH A BODY OF WATER

(71) Applicant: ECO Trawl AS, Søgne (NO)

(72) Inventor: Mads Bjørnenak, Kristiansand (NO)

(73) Assignee: ECO Trawl AS, Søgne (NO)

( * ) Notice: Subject to any disclaimer, the term of this patent is extended or adjusted under 35 U.S.C. 154(b) by 472 days.

(21) Appl. No.: 17/923,058

(22) PCT Filed: May 5, 2021

(86) PCT No.: PCT/NO2021/050113
§ 371 (c)(1),
(2) Date: Nov. 3, 2022

(87) PCT Pub. No.: WO2021/225451
PCT Pub. Date: Nov. 11, 2021

(65) Prior Publication Data
US 2023/0348031 A1    Nov. 2, 2023

(30) Foreign Application Priority Data
May 8, 2020   (NO) .................................. 20200544

(51) Int. Cl.
*B63G 8/00*  (2006.01)
*B63B 21/66*  (2006.01)
*B63H 5/15*  (2006.01)

(52) U.S. Cl.
CPC .............. *B63G 8/001* (2013.01); *B63B 21/66* (2013.01); *B63H 5/15* (2013.01)

(58) Field of Classification Search
CPC .......... B63G 8/00; B63G 8/001; B63B 21/66; B63H 5/15
See application file for complete search history.

(56) References Cited

U.S. PATENT DOCUMENTS

| | | | |
|---|---|---|---|
| 2,030,375 A | 2/1936 | Kort | |
| 3,085,533 A | 4/1963 | Groyl et al. | |
| 3,774,564 A * | 11/1973 | Bondon | B63G 8/001 114/244 |
| 3,999,499 A | 12/1976 | Kitabayashi | |

(Continued)

FOREIGN PATENT DOCUMENTS

| | | |
|---|---|---|
| DE | 942490 C | 5/1956 |
| DE | 1181484 B | 11/1964 |
| GB | 695641 A | 8/1953 |

(Continued)

OTHER PUBLICATIONS

Mortensen, Tatiana; International Search Report; PCT/NO2021/050113; Dated: Jul. 8, 2021; 3 pages.

*Primary Examiner* — Stephen P Avila
(74) *Attorney, Agent, or Firm* — Bradley Arant Boult Cummings LLP (57) ABSTRACT

A traction device for towing an object along a water surface or through a body of water, the traction unit comprising at least one propulsive engine. The device device has a common center of gravity, center of thrust and center of buoyancy (13). A bridle (17) is attached to turn about an axis (14) through said common center (13). The bridle (17) has an attachment (18) at a distal end from the turn axis (14) to attach a tow line extending to the towed object.

6 Claims, 7 Drawing Sheets

(56) References Cited

U.S. PATENT DOCUMENTS 6,260,500 B1     7/2001   Coakley
2009/0316526 A1   12/2009   Grall

FOREIGN PATENT DOCUMENTS

| | | | |
|---|---|---|---|
| JP | H03198731 A | 8/1991 | |
| NO | 320863 B1 | 2/2006 | |
| NO | 329801 B1 | 12/2010 | |
| NO | 343896 B1 | 7/2019 | |
| WO | WO-2010015254 A1 | 2/2010 | |
| WO | WO-2016179600 A1 * | 11/2016 | ............... B63B 1/28 |
| WO | WO-2017222390 A1 | 12/2017 | |

* cited by examiner

TRACTION DEVICE FOR TOWING AN OBJECT ALONG A WATER SURFACE OR THROUGH A BODY OF WATER

TECHNICAL FIELD

The present invention relates to a traction device for towing an object along a water surface or through a body of water.

BACKGROUND AND PRIOR ART

Trawling as a fishing technique has existed in its current form since the end of the 19th century. It is based on a bag shaped net that is towed through the water by a boat, i.e. a trawler. To keep the trawl net open, a pair of trawl doors are connected to the trawl some distance in front of the trawl opening. The doors have an angle of attack with respect to the draw direction, so that a horizontal spread is created.

Over the centuries the trawling technique has developed to include larger and larger trawls. The large trawl creates a substantial drag and hence ever larger trawlers have had to be employed to be able to pull the trawl. The result of this is that the size of the catch has increased, but also that the fuel consumption has increased. The fuel consumption is one of the greatest expenses in trawling. The fuel consumption is largely unrelated to the catch but is substantially depending on the distance the trawl is towed, the speed of the towing and the depth at which the trawl is being towed. The fuel consumption will increase with these factors, but not necessarily the catch.

One of the above factors, the trawling depth, is highly depending on the type of catch. For catching species, that are close to the bottom, such as flatfish or shrimp, the trawl has to be towed close to the bottom. This means that very long warps, i.e. the trawl wires that connect the trawl doors to the boat, have to be deployed. The length of the warps is several times the depth of the trawl. These warps create a substantial drag, which makes bottom trawling very fuel demanding, and also require the use of high-power engines.

Bottom trawling has been criticized from an environmental perspective because the trawl doors and weights of the trawl are dragged along the bottom and make long and wide trails, which disrupt and destroy the environment for seabed plants and animals. Consequently, there are restrictions on where and how much bottom trawling is allowed.

There have been many solutions suggested to improve trawling. Most of these are modifications of the conventional principle of a trawler that tows a trawl net with trawl doors. However, there have been some attempts to deviate from this principle.

One of these bold attempts is shown in GB 695641, which shows a trawl net that is being towed by a pair of underwater crafts. The crafts may be electrically driven and are connected to a mother ship by electrical power lines. The mother ship may also control the depth and side steering of the crafts. The mother ship is connected to the cod end of the net by guide lines, which means that the ship trails the trawl net. The guide lines are kept suitably taut during the trawling. The purpose of the guide lines is to pull the cod end up to the ship when the net is full.

The invention of GB 695641 was made in 1949, at a time when the technology for such underwater crafts was not mature enough to be used efficiently for trawling.

DE 1181484 also shows a suggested solution that uses underwater crafts for towing the net. In this solution the crafts are connected to each other by a boom or similar that keeps the crafts at a mutual fixed distance. The boom ensures that the net is held open. However, the boom structure will create a substantial extra drag for the trawl.

WO 2010/015254 shows a trawl configuration that uses one underwater craft that tows one side of the trawl net while the trawler tows the other side. As the underwater craft has a fixed length of wire connecting it to the net, there is little possibility of varying the trawling depth and it would not be possible to trawl below a certain depth.

NO320863 shows a more conventional trawling arrangement. It differs from a conventional arrangement in the fact that the trawl doors can be steered to a certain degree, to control the spread and depth of the trawl. However, as conventional trawling arrangements, the doors and the trawl must be towed by the vessel. This means that the vessel will be situated far forward of the trawl (the distance may vary depending on the depth but would be from a couple of hundred meters to more than one kilometer), and hence the echo sonar field of the vessel cannot possibly see the trawl.

JPH03198731 also relates to such a conventional trawling arrangement with a trawl eye.

There have also been a few attempts of towing other objects, such as a ship, by an underwater craft.

U.S. Pat. No. 3,999,499 describes a submarine cargo carrier that is driven and controlled by a surface vessel. A rotating shaft with universal joints provides power from the surface vessel to the submarine carrier. The surface vessel has its own propeller for propulsion.

U.S. Pat. No. 6,260,500 shows an emergency ship towing system comprising an underwater thrust unit that can be connected to a ship by a flexible towing line. The thrust unit has its own power supply but can be controlled from the ship. The thrust unit will be transported to a ship that is in distress by a helicopter and lowered onto the ship deck. Here one end of the towing line will be attached to the ship and the thrust device will be launched into the sea. The purpose is to tow the ship out of dire straits.

U.S. Pat. No. 3,085,533 shows a system for transporting oil under water, which includes a large underwater carrier and a smaller surface vessel. The surface vessel provides power to the underwater carrier and is in turn towed by the carrier.

Some of the prior art underwater units are not suitable for towing an object, such as a trawl or ship, along or through a body of water. Those that can be used for such a purpose are hampered by inefficiency and poor manoeuvrability.

DE 942490 C shows a traction unit for towing a boat. A bridle connects the tow line to the traction unit. The bridle is pivotable relative to the traction unit about an axis that goes through the centre of gravity of the traction unit.

US 2009316526 A1 shows a traction unit that is attached to a seismic tow to increase the spread of the tow, i.e. replace the otter boards of the tow. A bridle is pivotably attached to the traction unit.

NO 329801 B1 shows a trawl equipped with traction units in the form of water jets. The water jets are used to keep the trawl in correct height and at the correct sideways position.

Norwegian patent 343896, belonging to the present proprietor, describes a trawling arrangement, comprising a trawl net and at least two propelled and steerable traction units that are coupled to the trawl net, one on each lateral side, by sweep lines. The traction units are coupled to a vessel at the surface by least one electrical power cable. The electrical cable is configured to position the vessel so that the opening of the trawl net is within an echo sonar field of said vessel. The traction device has at least one propeller and a motor coupled to the propeller. The housing of the motor has an attachment bracket for attachment of sweep lines. A duct is arranged to encircle the propeller. At least one steering fin is hingedly attached relative to the motor housing, and the steering fin is situated at the opposite side of the hydrodynamic centre of the traction device relative to said attachment bracket.

Research done by the proprietor after the filing of NO 343896 shows that a trawler will use 30% less energy by using the traction units of this patent. This is due to several factors, such as a more rectilinear pulling, elimination of trawl doors, which creates a substantial drag, and more efficient use of propellers that can be designed for subsea use where cavitation is not an issue.

Despite the higher efficiency achieved by the traction units of the above mentioned NO 343896, it has been found that the pull of the sweep lines on the traction unit will act to turn the unit away from the intended course and into a course that is more in line with the sweep lines. This turning has to be counteracted by the steering fins. Extensive use of steering fins increases the drag and hence also the power consumption.

SUMMARY OF INVENTION

The object of the present invention is to provide a more efficient traction device, which is also easier to control.

The more efficient traction device means that the same thrust can be achieved with less power. For a propeller driven traction device, it means that, e.g., the blade area can be reduced, resulting in a smaller device.

The device will have less drag than prior art traction devices since the rudders to a much less degree have to counteract a pulling force acting at an angle to the thrust. The rudder area may hence also be reduced.

DETAILED DESCRIPTION OF THE INVENTION

Figure 1:
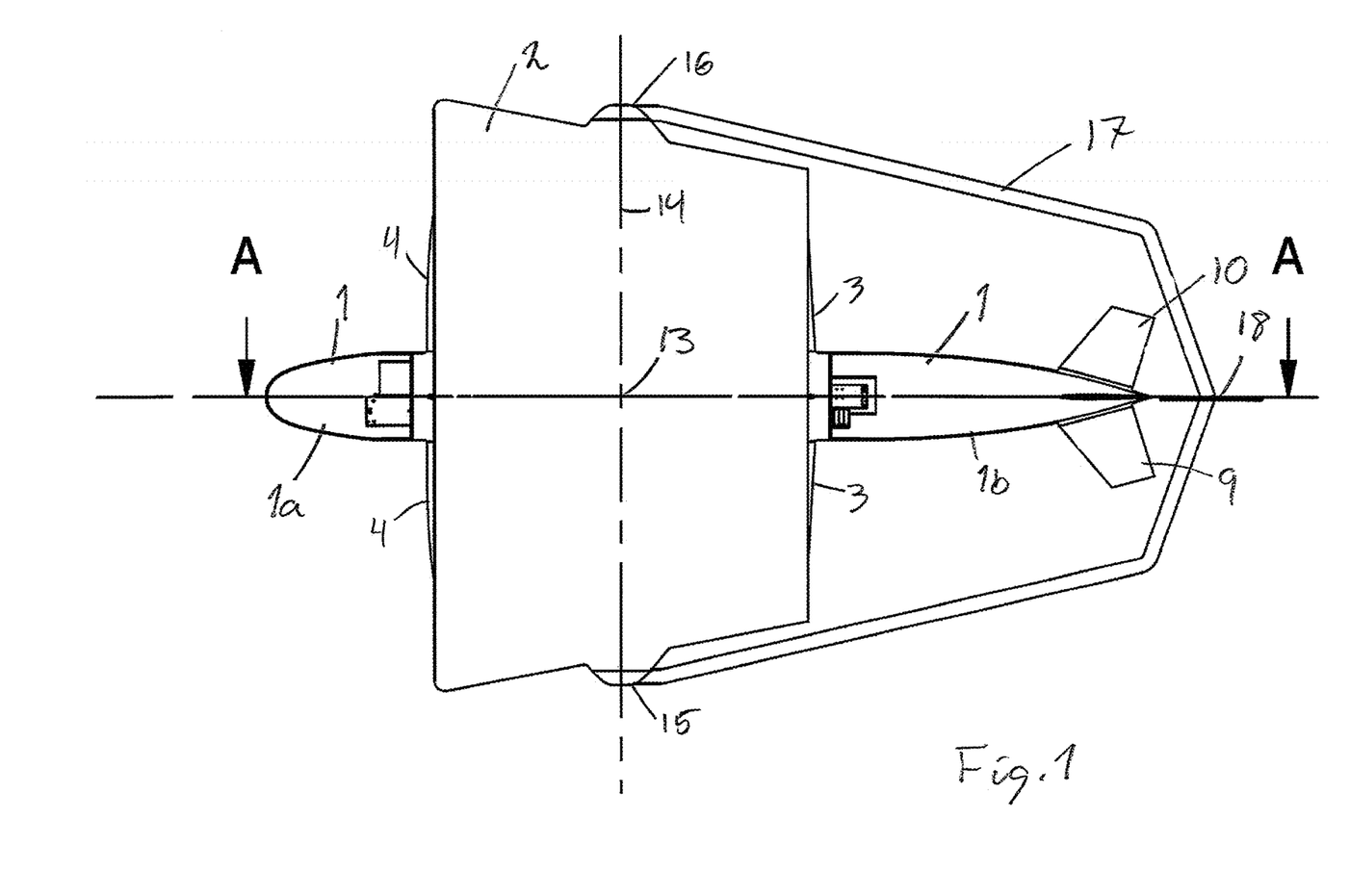
FIG. 1 shows a traction unit of the invention in a side elevation view.
Figure 6:
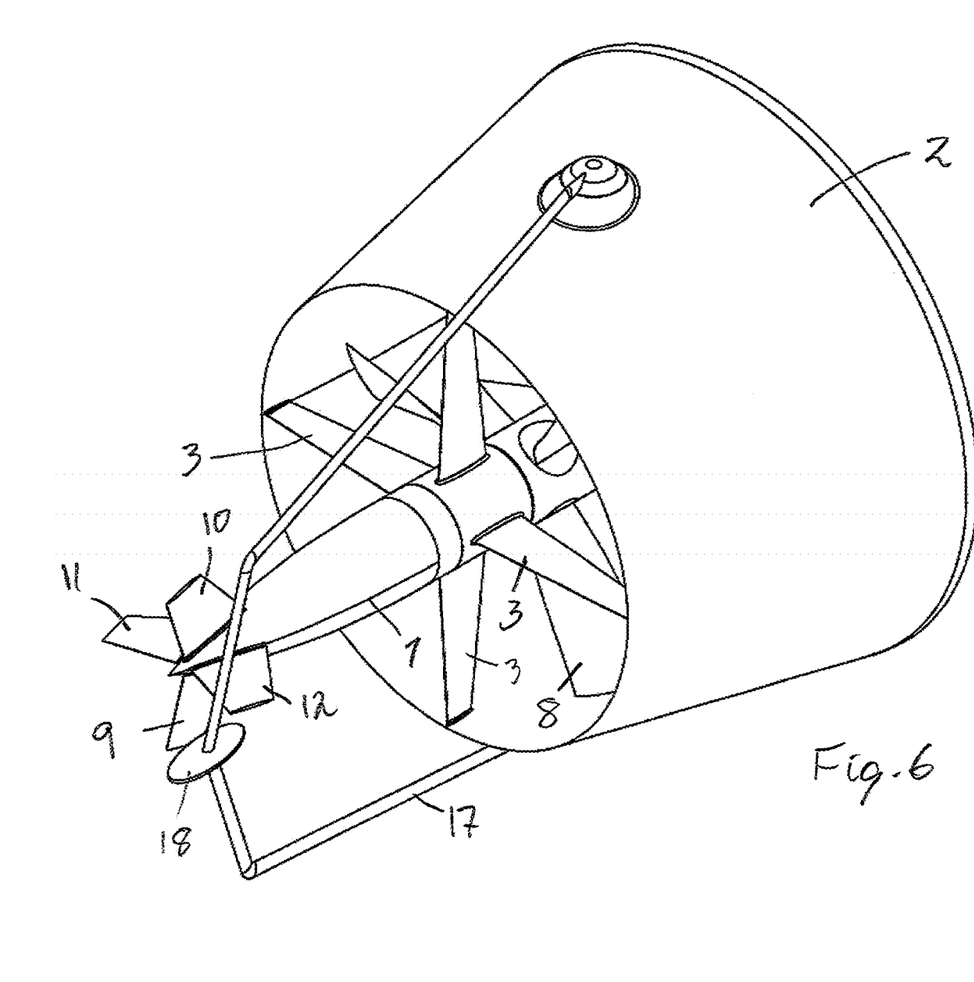
FIG. 6 shows an isometric view from the rear of the traction unit of the invention.
Figure 7:
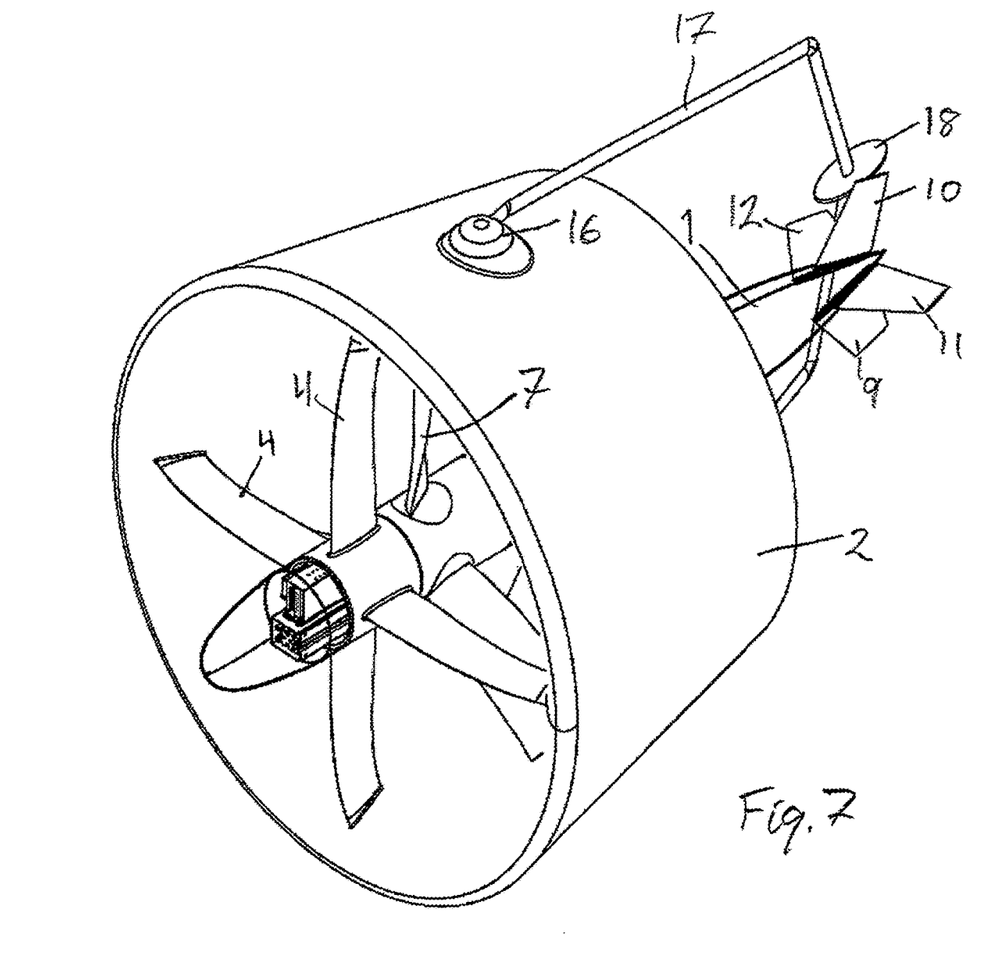
FIG. 7 shows an isometric view from the front of the traction unit of the invention.

FIG. 1 shows a side elevation view of the traction device of the invention, in the form of a traction unit. The unit has a propulsive engine comprising a longitudinal motor housing 1. The propulsive engine further comprises a duct 2 encircling the motor housing 1. The duct 2 is firmly attached to the motor housing 1 by webs 3 and 4 (best seen in FIGS. 6 and 7). A front portion 1a of the motor housing 1 extends forward of the duct 2 and a rear portion 1b of the motor housing 1 extends rearwards of the duct 2.

Figure 2:
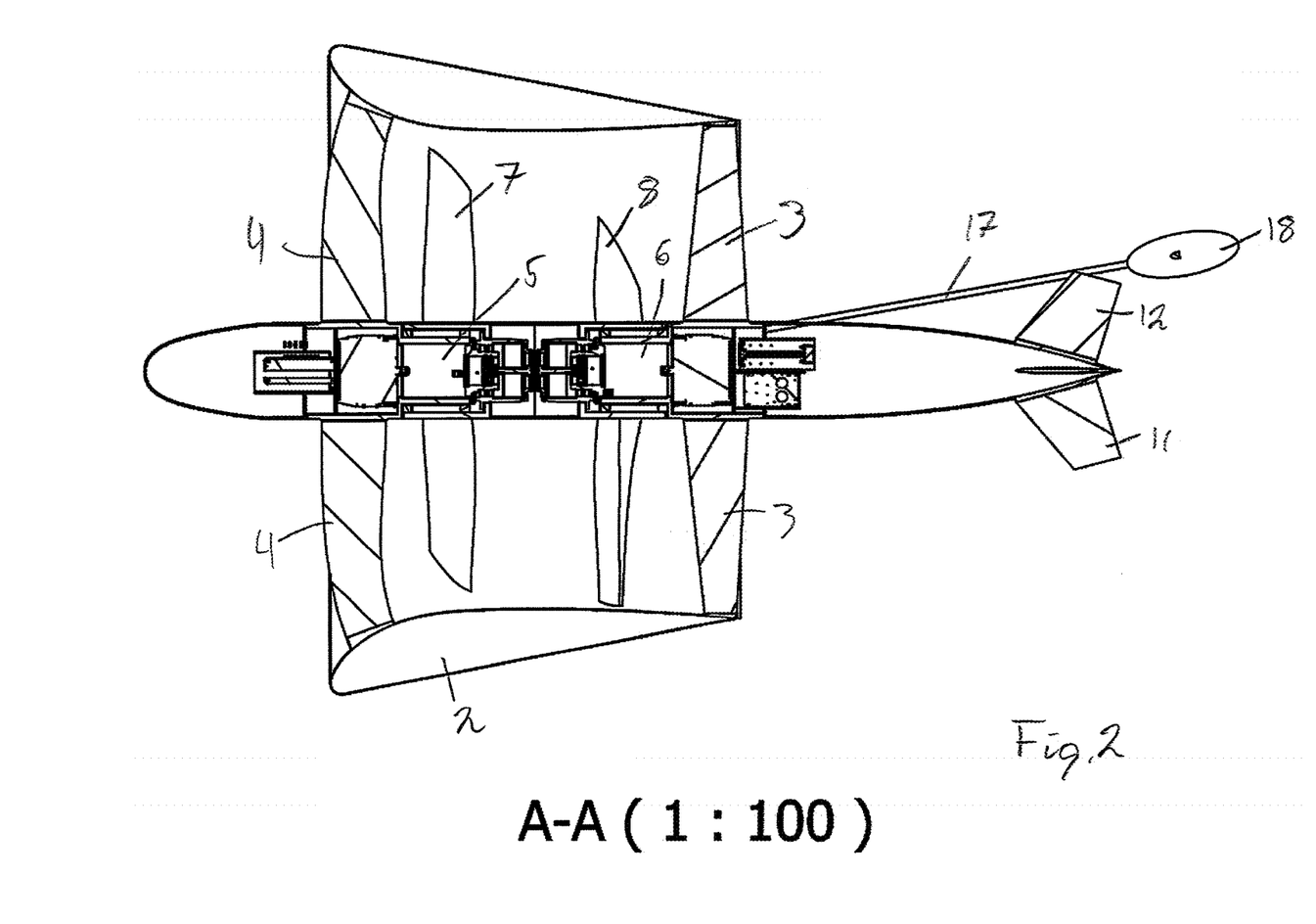
FIG. 2 shows a longitudinal section along the line A-A in FIG. 1.

As shown in the longitudinal section in FIG. 2, the duct 2 has a shape of an accelerating nozzle with a frustoconical outer shape and an inner foil shaped wall. This is a conventional way of shaping a duct around a propeller. This type of duct is often referred to as a Kort nozzle after the inventor who patented this type of duct in 1936 (see U.S. Pat. No. 2,030,375).

Figure 4:
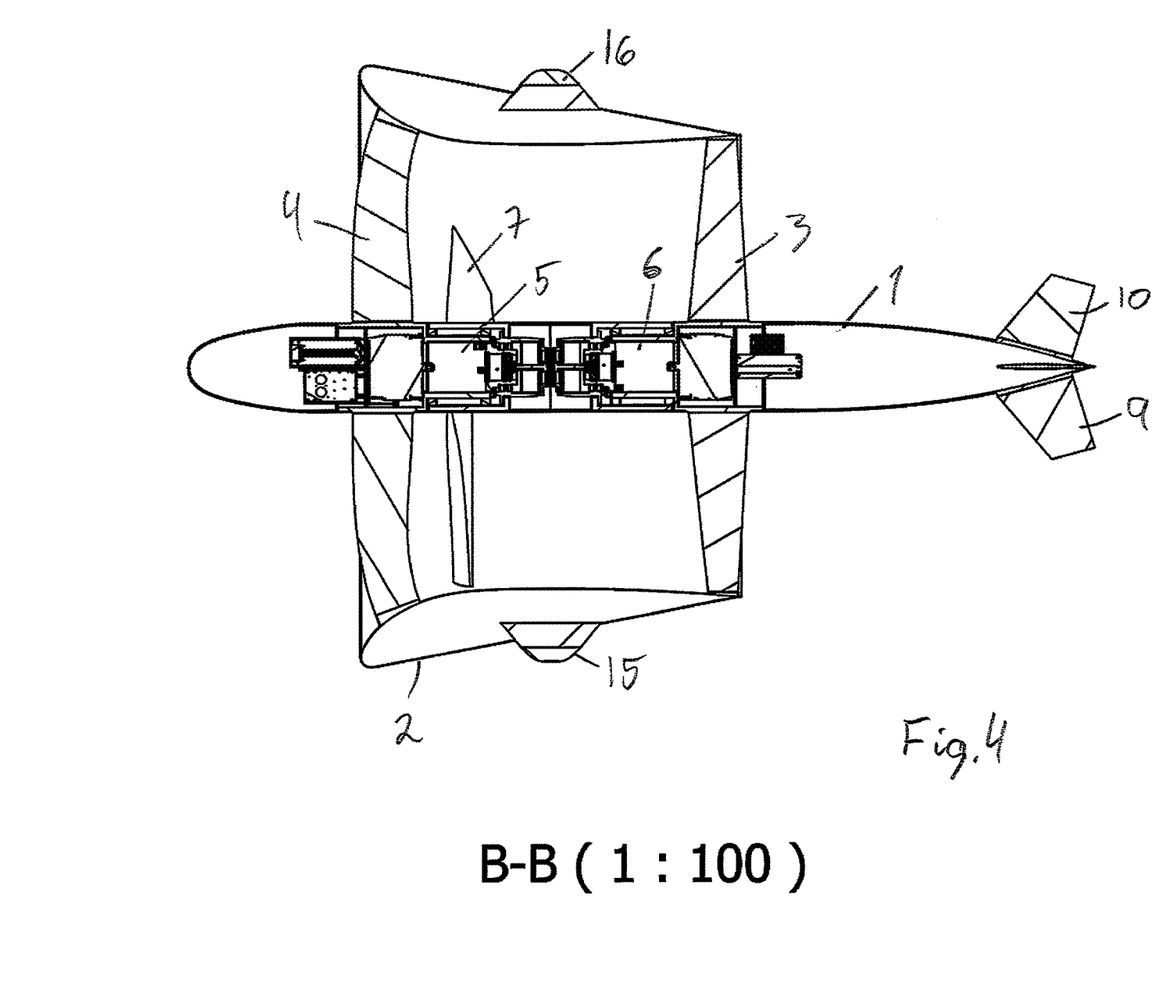
FIG. 4 shows a longitudinal section along the line B-B in FIG. 3.
Figure 5:
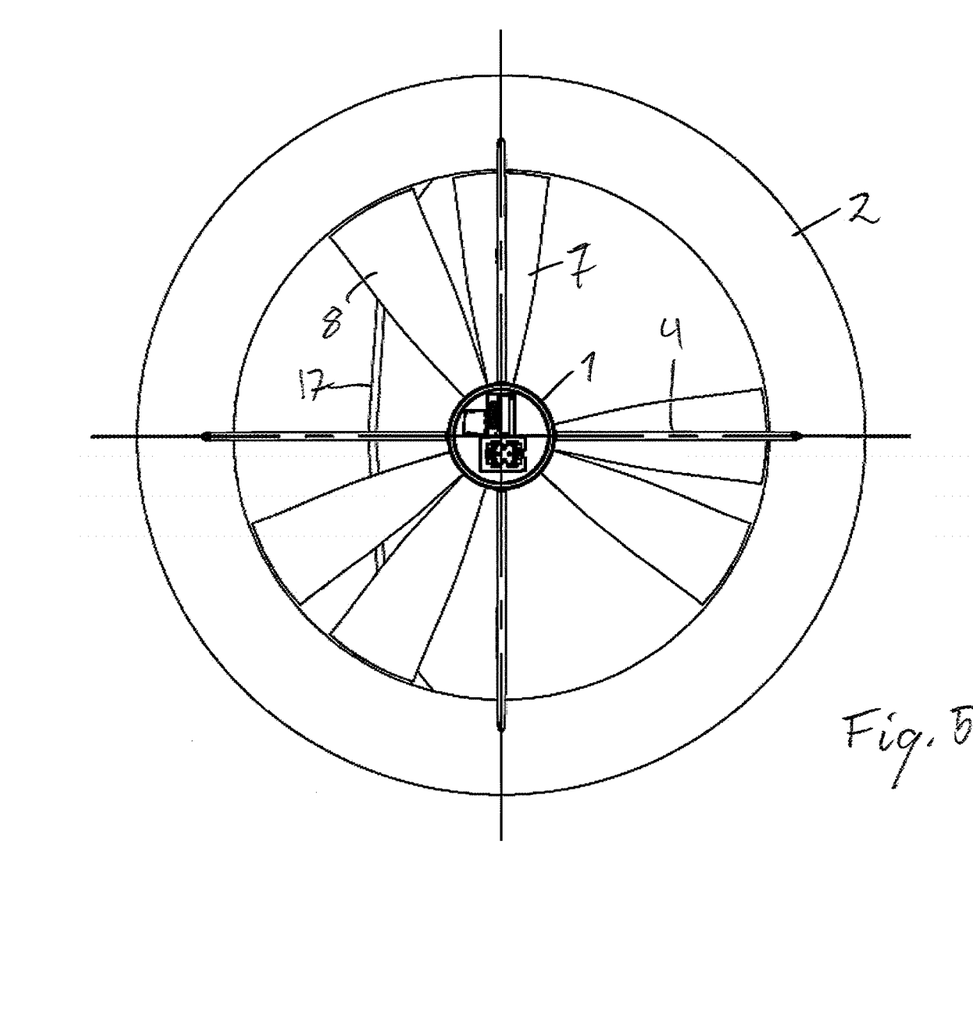
FIG. 5 shows a front elevation view of the traction unit of the invention.

The motor housing 1 contains two motors 5, 6 (see FIGS. 2 and 4). A propeller 7, 8 is coupled to each motor 5, 6 (best shown in FIG. 2). The propellers 7, 8 are mounted to rotate in opposite directions but to give a thrust in the same direction. The roll of the unit, i.e. movement about the propeller axis, is achieved by differential speed of each propeller.

At the rear end of the motor housing there are four rudders 9, 10, 11, 12. These are set at right angles to each other. Two rudders 9, 10 are rotatable in a first plane, such as a vertical plane, to turn the traction unit in the horizontal plane, and two rudders 11, 12 that are rotatable in a second perpendicular plane, such as a horizontal plane, to turn the traction unit in the vertical plane. By operating the rudders, the traction unit can turn about any axis perpendicular to the longitudinal axis of the motor housing 1.

Figure 3:
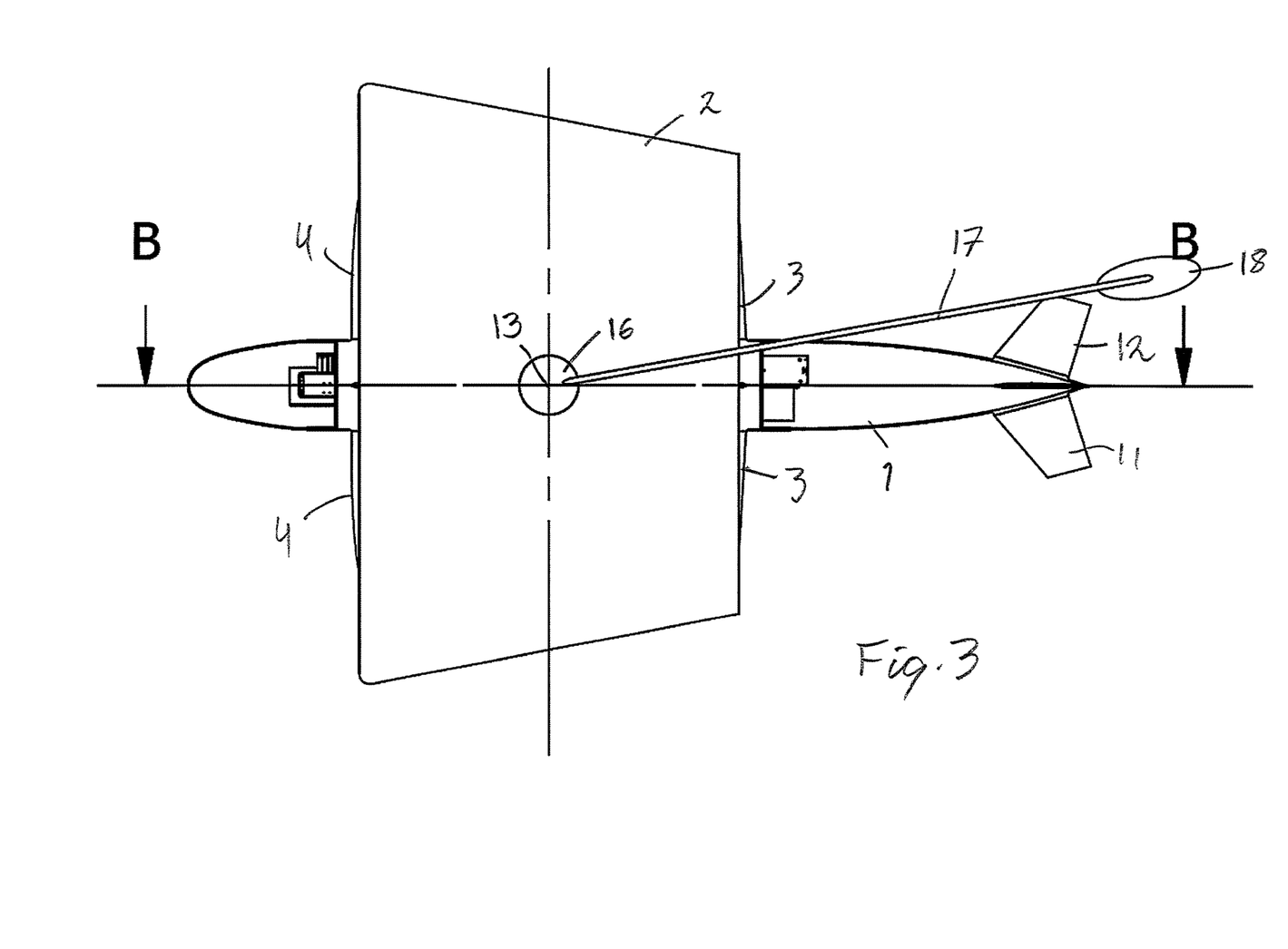
FIG. 3 shows a planar view of the traction unit of the invention.

The traction unit is built to have a common center of gravity, center of buoyancy and center of thrust, denoted by 13 (see FIGS. 1 and 3). Coinciding with an axis 14 through this center 13 the duct 2 has mountings 15, 16 for a bridle 17 that is rotatably attached to each mounting 15, 16, so that the bridle 17 can turn about the axis 14. The bridle 17 extends rearward of the rudders 9-12 and can turn unhindered of the rudders 9-12. At the rearward end of the bridle 17 there is a line attachment 18. A tow line (not shown) between the towed object and the traction unit 2 will be attached at the attachment 18. The attachment 18 can also function as an attachment point and guide for a power and control cable (not shown) between the towed object and the traction unit. This cable may, however, be attached elsewhere to the traction unit as long as it is prevented from interfering with the rudders.

The bridle 17 is conveniently a stiff bow that maintains its shape even if subjected to a large pulling force. It can be made of metal, such as high tensile steel or a composite material, such as a carbon fiber reinforced matrix.

The above described design of the traction unit enables the traction unit to easily turn about the axis 14 and thereby quickly change the direction of pull. The direction of pull will no longer be hindered by the direction of the tow line attached to it, but the tow line will follow the movement of the traction unit.

Two or more traction units can be attached to one object to operate in unison to tow an object. Traction units can also pull in different directions to accurately position an object.

Instead of two oppositely rotating propellers, it is also conceivable to use the rudders 9-12 to counteract rotation of the unit.

Instead of propellers, it is also conceivable to use other types of propulsive engines, such as a waterjet. In that case the duct is superfluous, and the bridle may be attached to the shroud of the water jet.

The invention claimed is:

1. A traction device for towing an object along a water surface or through a body of water, the traction device comprising:
    a propulsive engine,
    wherein the traction device has a common center of gravity, center of thrust, and center of buoyancy, and
    a bridle being attached to turn about an axis through the common center, the bridle having an attachment at a distal end from the turn axis to attach a tow line extending to the towed object.

2. The traction device of claim 1, wherein the bridle is a stiff bow partially surrounding the propulsive engine.

3. The traction device of claim 1, wherein the propulsive engine comprises at least one propeller that is encircled by a duct in the form of an accelerating nozzle.

4. The traction device of claim 1, wherein the propulsive engine comprises a set of rudders capable of turning the traction device about at least two axes perpendicular to a longitudinal axis of the traction device.

5. The traction device of claim 3, wherein the bridle is rotatably attached to opposite sides of the duct and extends beyond the rudders.

6. The traction device of claim 1, wherein the bridle forms an attachment point and guide for a power and control cable extending to the traction device.

* * * * *